United States Patent [19]

Murakoshi et al.

[11] Patent Number: 4,810,089
[45] Date of Patent: Mar. 7, 1989

[54] PHOTOELASTIC EFFECT MEASURING DEVICE

[75] Inventors: Takeo Murakoshi, Katsuta; Masaki Yoshii, Yokohama; Shigeo Tohyama, Katsuta; Sadao Minakawa, Mito; Aizo Kaneda, Yokohama, all of Japan

[73] Assignee: Hitachi, Ltd., Tokyo, Japan

[21] Appl. No.: 84,076

[22] Filed: Aug. 11, 1987

[30] Foreign Application Priority Data

Aug. 13, 1986 [JP] Japan .................. 61-188492

[51] Int. Cl.[4] .................. G01L 1/24; G01N 21/23
[52] U.S. Cl. .................. 356/35; 356/332; 356/365; 356/367
[58] Field of Search .................. 356/32, 33, 35, 365, 356/366, 367, 332

[56] References Cited

U.S. PATENT DOCUMENTS 3,462,227 8/1969 Tipotsch .................. 356/332
4,309,110 1/1982 Tumerman .................. 356/365

FOREIGN PATENT DOCUMENTS 935998 12/1955 Fed. Rep. of Germany ...... 356/332

Primary Examiner—Davis L. Willis
Assistant Examiner—Matthew W. Koren
Attorney, Agent, or Firm—Antonelli, Terry & Wands

[57] ABSTRACT

A photoelastic effect measuring device comprising a single white light source, a prism dispersing light emitted by said white light source and a variable slit device, which selects an arbitrary spectrum of light thus dispersed is disclosed, in which for a photoelastic effect measurement using white light, the slit width is opened totally so that all the light spectrum pass therethrough so as to pass through a sample to be measured and for a photoelastic effect measurement using a specified monochromatic light beam, the slit width is controlled so as to have a predetermined opening so that only a specified light spectrum can pass therethrough so as to pass through a sample to be measured.

10 Claims, 3 Drawing Sheets

F I G. 3
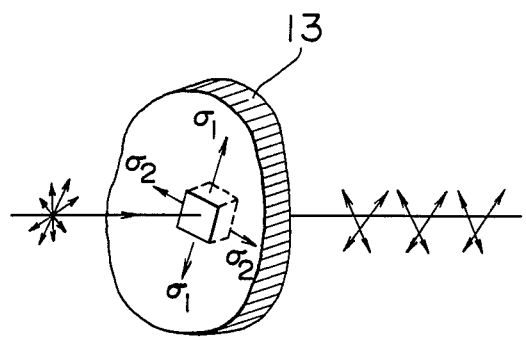
F I G. 4
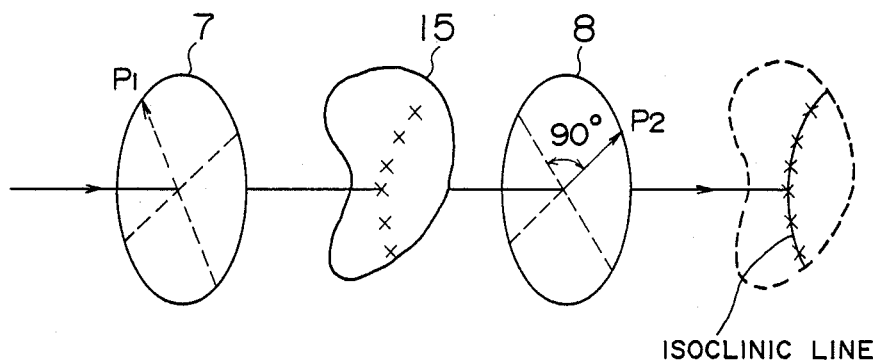
ISOCLINIC LINE

PHOTOELASTIC EFFECT MEASURING DEVICE

BACKGROUND OF THE INVENTION

This invention relates to a photoelastic effect measuring device utilized for the stress analysis of a body.

When force is applied to an optically isotropic and transparent body such as glass, plastics, etc., an optical anisotropy is produced, depending on strain or stress, which gives rise to a birefringence. In the case where a stress analysis of a sample is effected by utilizing this photoelastic effect, it requires white light and a monochromatic light having a specified wavelength as light sources and measurement results should be obtained for each of these light sources.

Prior art photoelastic effect measuring devices were provided either with two sorts of light sources, white and monochromatic, or with a white light source and a filter for obtaining a monochromatic light.

An example of the photoelastic effect measuring device is disclosed in U.S. patent application, Ser. No. 711, filed Jan. 6, 1987 by Yoshii et al. In this device a white light source is used and the white light emitted by it is dispersed by means of a grating in order to obtain selectively only a monochromatic light having a specified wavelength.

The grating has a high dispersive power and when white light is reflected by it, a light spectrum dispersed over a wide range of angle is obtained. On the contrary, the dispersive power of a prism is lower than that of a grating and the band width of its light spectrum is considerably narrower than that of the grating. Therefore light energy passing through a predetermined slit, when white light is dispersed by means of a prism, is several tens to several hundreds times as high as when it is dispersed by means of a grating. Further, when a monochromatic light is obtained by a grating and a slit, the light energy is too low and it may be difficult to measure it. In addition, since the width of the light spectrum dispersed by means of a grating is extremely great, it is impossible to fabricate a slit, which can make the light pass through over the whole light spectre.

SUMMARY OF THE INVENTION

The object of this invention is to provide a photoelastic effect measuring device having a high measurement sensitivity, which is simple to manipulate without change-over of the sort of light sources and exchange of filters.

In order to achieve this object, according to this invention, white light and an arbitrary monochromatic light can be obtained selectively from a white light source by using a white light source and a spectroscope consisting of a prism having a low dispersive power and a variable slit.

BRIEF DESCRIPTION OF THE DRAWINGS

FIG. 3 is a scheme for explaining the photoelastic effect; and

FIG. 4 is a scheme for explaining the isoclinic line.

DESCRIPTION OF THE PREFERRED EMBODIMENTS

Hereinbelow an embodiment of this invention, referring FIGS. 1 to 3.

Figure 1:
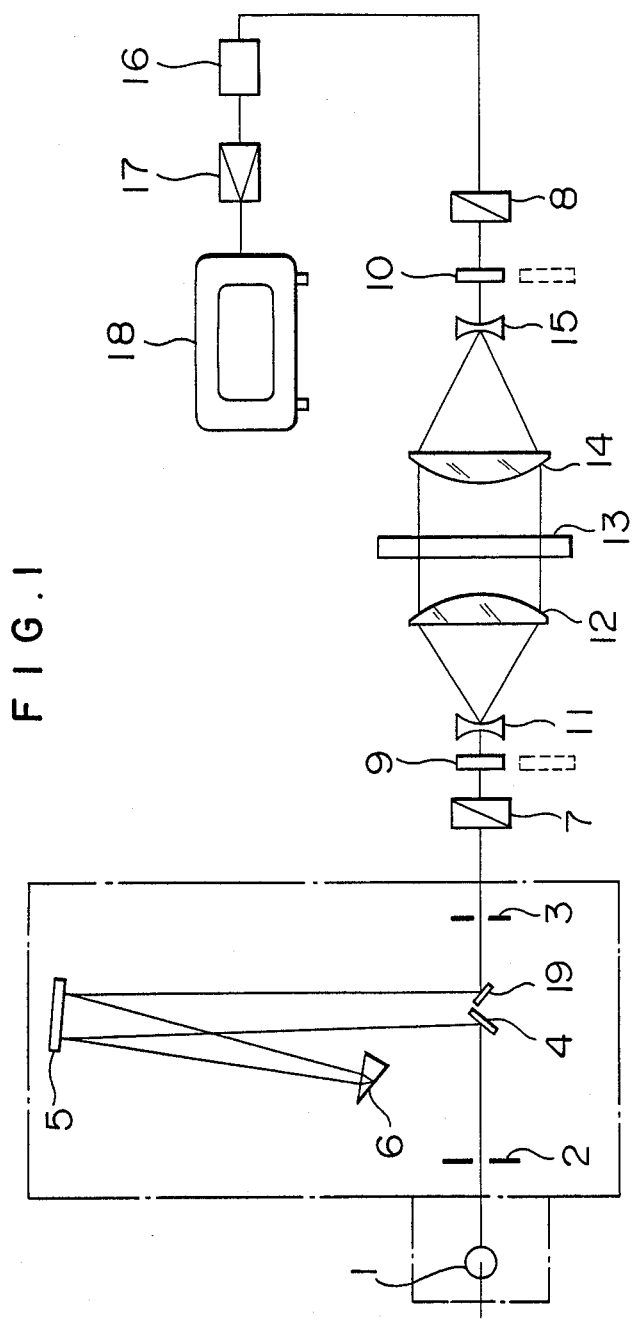
FIG. 1 is a system diagram illustrating an embodiment of the photoelastic effect measuring device according to this invention.

In FIG. 1 reference numeral 1 represents a light source, which is a halogen lamp, e.g. an iodine lamp. However a usual tungsten lamp may be used also therefor. 2 is an entrance slit, whose width can be varied between 0 and about 2 mm by instructions from an operation panel 30 indicated in FIG. 2, linked with an exit slit 3. The variation of the width is carried out by a pulse motor 31. 4 is a toroidal mirror guiding the light beam coming from the entrance slit 2 to collimator mirror 5. The light beam is transformed into a parallel beam by the collimator 5 and projected to a prism 6. In this embodiment a prism of reflection-dispersion type, whose reflecting surface is metallized with alluminium or gold, is used for this prism 6. However it is not restricted thereto, but a prism of transmission-dispersion type may be used also as well. A spectroscope using a prism of reflection-dispersion type may be smaller than that using a prism of transmission-dispersion type.

A spectroscopically separated light beam can be taken out from the exit slit 3 in the form of a monochromatic light beam having an arbitrary wavelength spectrum by rotating the prism 6 by means of a pulse motor 32 and a cam 33 driven by it according to instructions from the operation panel 30. The purity in wavelength and the energy of the light beam exiting from the exit slit 3 can be determined by setting the width of the exit slit 3. That is, the purity in wavelength is raised with decreasing the width of the slit and the energy is increased with increasing width. Concerning the relation between the wavelength and the band pass of the light used in the photoelastic effect measuring device, the latter may be about 50 nm for the visible wavelength region and about 80 nm for the near infrared wavelength region. Since the light energy is lower at the near infrared wavelength region than at the visible wavelength region, the light energy is apt to be short for the stress analysis of samples, which are used particularly in the near infrared wavelength region, e.g. ABS resin. In this case it is not possible to observe clearly isochromatic lines in a dark field, when the polarization axis of a polarizer 7 and that of an analyzer 8 intersect perpendicularly with each other. The device must be able to be used with a band pass as large as possible at this time.

Reference numerals 7 and 8 represent a polarizer and an analyzer, respectively, which have a function to transform monochromatic light into linearly polarized light. 9 and 10 are quarter wave plates, which have a role of transforming the linear polarization into the circular polarization and the circular polarization into the linear polarization. For obtaining isoclinic lines among measurement items of the photoelastic effect the quarter wave plates 9 and 10 are removed from the optical path by means of a solenoid 34 according to instructions from the operation panel 30. 11 represents a double-concave lens and which enlarges a light beam of 5–10 mm$\phi$ to a light beam of about 150 mm$\phi$. In this embodiment a lens of f=30 is used. The light beam enlarged by a concave lens of f=30 is transformed into a parallel beam by a convex lens 12 and projected to a sample to be measured.

The light beam, which has passed through the sample 13, is focused by the double-concave lens 15 and enters a TV camera 16 through the quarter-wave plate 10 and the analyzer 8. Image signals of photoelasticity fringes (clear and dark) due to the photoelastic effect of the sample 13 imaged by the TV camera 16 are amplified by an amplifier and their image is displayed on the screen of a TV monitor 18. In this way it becomes possible to effect measurements of the photoelastic effect in the sample 13.

FIG. 3 is a scheme for explaining the photoelastic effect.

Now it is supposed that force is applied to the sample 13 and principal stresses $\sigma_1$ and $\sigma_2$ are produced in its interior. When a circularly polarized beam is projected thereto, the incident light beam is divided into two linearly polarized light beams, each of which oscillates in a plane of the direction of each of the principal stresses. When these polarized light beams are observed through the analyzer, the part where the stresses are produced is observed in the form of dark fringes with respect to a clear background or clear fringes with respect to a dark background, depending on the direction of the analyzer. These fringes represent series of portions having same stresses, i.e. isochromatic lines.

The isochromatic lines are measured in the following way. The slits 2 and 3 are set at a band pass corresponding to the necessity according to instructions from the operation panel 30 in order to take the monochromatic light in the polarizer 7, and the polarizer 7 and the analyzer 8 are controlled by the pulse motor 35 so that their polarization axes are parallel to each other.

Then, when the monochromatic light beam is projected on the sample to be measured in the state where the advanced phase axes of the quarter wave plates 9 and 10 intersect perpendicularly to each other, dark lines of orders of half integers, i.e. a clear field can be obtained. Further, when the polarizer 7 and the analyzer 8 are rotated by the pulse motor 35 so that their polarization axes intersect perpendicularly to each other, dark lines of orders of integers, i.e. a dark field can be obtained.

If the number of order n of the isochromatic line at that point is known, the difference $\sigma_1 - \sigma_2$ between the two principal stresses $\sigma_1$ and $\sigma_2$ can be obtained by using Eq. (1).

$$\sigma_1 - \sigma_2 = (n\lambda)/ct \quad (1)$$

where $\lambda$ represents the wavelength; c the photoelastic constant, which is characteristic of a substance; and t the thickness of the sample to be measured.

Next, the isoclinic lines can be obtained easily by means of this device according to the following steps.

The quarter wave plates 9 and 10 are removed according to instructions from the operation panel 30, as indicated by broken lines in FIG. 1 and the polarizer 7 and the analyzer 8 are so arranged that they have their polarization planes $p_1$ and $p_2$, respectively, which intersect perpendicularly with each other.

At this time the intensity I of the light beam obtained when a parallel light beam having a certain wavelength $\lambda$ passes therethrough can be represented by Eq. (2).

$$I = I_0 \sin^2 2\phi \sin^2 (\delta/2) \quad (2)$$

where $\phi$ represents the angle comprised between the direction of the principal stress and the polarization plane of the polarizer; $\sin^2 (\delta/2)$ is a term representing the isochromatic lines described above; $I_0$ is the intensity of the incident light beam; and $\delta = (2\pi/\lambda) c (\sigma_1 - \sigma_2) t$.

For any value of $\delta$, $I=0$, when $\phi=0$ and $\pi/2$, independently of the wavelength $\lambda$, due to the term of $\sin^2 2\phi$.

That is, the points where the direction of the principal stress and the polarization plane of the polarizer are in accordance with each other, the latter intersecting perpendicularly with the polarization plane of the analyzer, (points 15 indicated by X in FIG. 4) are dark. The trajectory corresponding to a series of these points, where the direction of the principal stress is constant, is displayed in the form of a dark line. The isochromatic line is a line, where the stress is constant concerning the intensity of the principal stress, and on the other hand it can be said that the isoclinic line is a line where the direction of the stress is constant concerning the direction of the principal stress.

In the case where isoclinic lines are to be obtained, usually white light is used in order that they are not confused with isochromatic lines. At this time, in the device according to this invention, the white light can be obtained by projecting light including wavelengths of wide range on the polarizer 7 while giving an instruction to open totally the slit through the operation panel 30.

Now, the control device for the optical system indicated in FIG. 2 will be explained below.

At first, the operation in the case where the isoclinic lines are measured will be explained. In this case white light is used, as explained previously. The isoclinic line measurement mode is selected on the operation panel 30. A program for the isoclinic line measurement is stored in a ROM. When the isoclinic line measurement mode is selected, the signal specified therefore is inputted through an I/O circuit in a CPU. The CPU sends a control signal through an interface circuit (I/F) to a drive circuit 36 of the pulse motor 31 for driving the slits according to the program stored in the ROM. The slit driving motor 31 opens the slits 2 and 3 by a predetermined amount, receiving the driving signal. In this case, since white light is necessary, the slit 3 is opened totally so that all the spectrum of the light dispersed by the prism 6 can pass therethrough. In the isoclinic line measurement, since the quarter wave plates 9 and 10 are unnecessary, they are removed from the optical path. Also in this case the CPU gives a driving circuit 38 a control signal, responding to the signal specifying the isoclinic line measurement mode from the operation panel 30, which driving circuit 38 removes the quarter wave plates 9 and 10 from the optical path, as indicated by the broken lines in FIG. 1, driving a solenoid 34 for driving the quarter wave plates.

Next the operation of the device in the case where the isochromatic lines are measured will be explained. When the isochromatic line measurement mode is selected on the operation panel 30, a selection signal is inputted in the CPU. The CPU gives the driving circuit 36 a drive signal through the I/F according to the isoclinic line measurement program stored in the ROM. The driving circuit 36 controls the slits 2 and 3 so that they have a predetermined width. In the case where dark lines of orders of half integers (clear field) are observed, the polarizer 7 and the analyzer 8 are controlled by the pulse motor 35 so that their polarization axes are parallel to each other. In this case also the driving circuit 39 receives the control signal from the CPU and drives the pulse motor 35, responding thereto.

Further, in the case of the isochromatic line measurement the quarter wave plates 9 and 10 are controlled by the CPU so as to be inserted into the optical path. In the case where dark lines of orders of integers (dark field) are observed, the polarizer 7 and the analyzer 8 are driven by the pulse motor 35 so that their polarization axes are perpendicular to each other. Further it is specified from the operation panel 30 whether observations are effected in the clear field or in the dark field. The CPU controls the driving circuit according to the programs stored in the ROM, responding to this specification.

Figure 2:
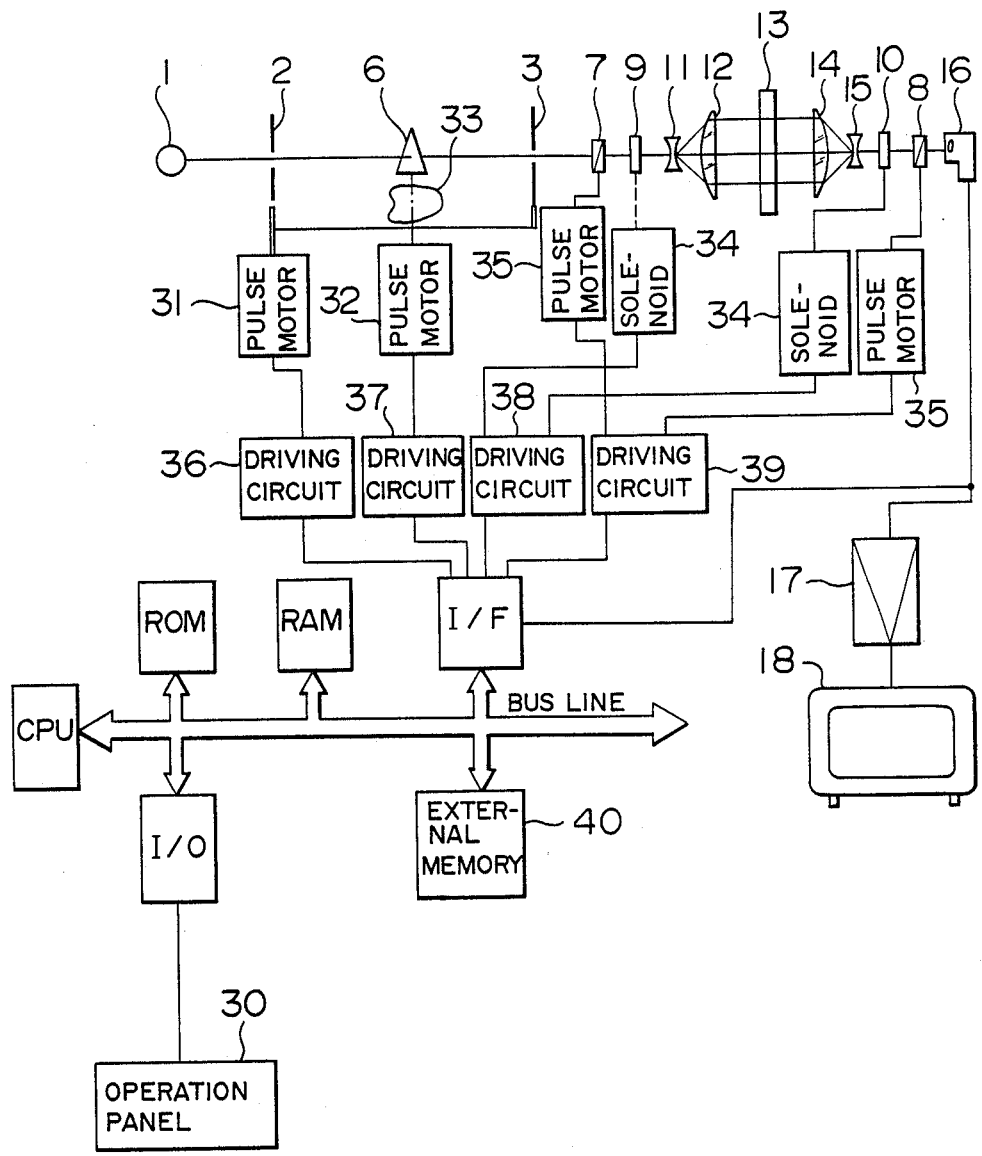
FIG. 2 is a block diagram of a control system controlling the optical system indicated in FIG. 1.

In FIG. 2 reference numeral 40 represents an external memory device, e.g. a floppy disc device, which takes-in data from TV camera and transfers the data to an external display system such as a plotter printer.

A well known device may be used for the microcomputer consisting of these CPU, ROM, I/O, I/F and RAM.

In the above an embodiment of this invention has been described. Fresnel Rhomb quarter wave plates may be used instead of the quarter wave plates 9 and 10. In this case, since the optical axis is deviated, when the Fresnel Rhomb quarter wave plates are removed, it is necessary to mount a separate mirror for correction.

Although, in this embodiment, Glan-Taylor prisms made of calcite having a good extinction ratio and no light absorption in a wavelength region between 310 and 2300 mm, Glan-Thomson prisms may be used instead thereof.

We claim:

1. A device for measuring a photoelectric effect on a transparent sample, through which a light beam is transmitted comprising:
    a white light source emitting light including a plurality of light spectrums;
    a prism dispersing light emitting by said white light source;
    a slit device passing the dispersed light from said prism, said slit device having a variable slit width;
    an optical device disposed before and after said sample for enabling a light beam, which has passed through said slit device, to pass through said sample;
    a photodetector device for detecting light which has passed through said sample; and
    slit control means for selectively changing the width of said slit device and for fully opening the slit width to enable all of the light spectrums of said dispersed light to pass therethrough so as to enable observation of isoclinic lines of said sample on said photodetector device and for narrowing the slit width to enable only a desired spectrum in said dispersed light to pass therethrough so as to enable observation of isochromatic lines of said sample on said photodetector device.

2. A device according to claim 1, wherein said photodetector device is a television camera.

3. A device according to claim 1, wherein said prism is a prism of reflection-dispersion type.

4. A device according to claim 1, wherein said prism is a prism of transmission-dispersion type.

5. A device according to claim 1, wherein said white light source is a halogen lamp.

6. A device according to claim 1, wherein said optical device comprises a collimator lens system disposed along an optical path of the light passing through said sample on both the sides of said sample, two quarter wave plates disposed on both the outer sides of said collimator lens system, polarization devices disposed on both the outer sides of said quarter wave plates, and means for controlling said polarization devices and said quarter wave plates so that polarization planes of said polarization devices are arranged to be perpendicular to each other when said quarter wave plates are removed from said optical path to enable the observation of isoclinic lines of said sample on said photodetector device, and for inserting said quarter wave plates in said optical path and arranging advance phase axes of said quarter wave plates to be perpendicular to each other to enable the observation of isochromatic lines of said sample on said photodetector device.

7. A device according to claim 6, further comprising a microcomputer, said control means and said means for controlling being responsive to outputs from said microcomputer, said slit control means including a first motor for controlling the width of said slit device and a first motor driving circuit for driving said first motor in response to an output from said microcomputer, said means for controlling including a second motor controlling removal and insertion of said quarter wave plates from and into said optical path, a second motor driving circuit for driving said second motor, a third motor for controlling the direction of the polarization plane of said polarization devices and a third motor driving circuit for driving said third motor, said second and third motor driving circuits being responsive to outputs from said microcomputer.

8. A device according to claim 6, wherein said quarter wave plates are Fresnel Rhomb quarter wave plates.

9. A device according to claim 6, wherein said polarization device is a Glan-Taylor prism.

10. A device according to claim 6, wherein said polarization device is a Glan-Thomson prism.

* * * * *